(12) United States Patent  
Thompson

(10) Patent No.: US 8,627,668 B2
(45) Date of Patent: Jan. 14, 2014

(54) SYSTEM FOR FUEL AND DILUENT CONTROL

(75) Inventor: Brett Matthew Thompson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 578 days.

(21) Appl. No.: 12/787,247

(22) Filed: May 25, 2010

(65) Prior Publication Data

US 2011/0289932 A1 Dec. 1, 2011

(51) Int. Cl.
*F02C 7/22* (2006.01)
*F02C 3/20* (2006.01)

(52) U.S. Cl.
USPC .......................... 60/776; 60/39.463

(58) Field of Classification Search
USPC .............. 60/737, 741, 740, 742, 39.091, 776, 60/39.26, 39.463
See application file for complete search history.

(56) References Cited

U.S. PATENT DOCUMENTS

| | | | |
|---|---|---|---|
| 3,982,878 A * | 9/1976 | Yamane et al. ................... | 431/2 |
| 5,311,742 A | 5/1994 | Izumi et al. | |
| 5,617,716 A * | 4/1997 | Schreiber et al. ............... | 60/775 |
| 6,082,092 A | 7/2000 | Vandervort | |
| 6,434,945 B1 * | 8/2002 | Mandai et al. .................. | 60/740 |
| 7,690,204 B2 | 4/2010 | Drnevich et al. | |
| 7,895,821 B2 * | 3/2011 | Annigeri et al. ........... | 60/39.463 |
| 2001/0004827 A1 * | 6/2001 | Vandervort et al. .......... | 60/39.55 |
| 2007/0082306 A1 * | 4/2007 | Drnevich et al. ............... | 431/12 |
| 2007/0234735 A1 * | 10/2007 | Mosbacher et al. ............ | 60/780 |
| 2007/0271929 A1 * | 11/2007 | Berry .............................. | 60/782 |
| 2008/0083229 A1 * | 4/2008 | Haynes et al. .................. | 60/776 |
| 2008/0295520 A1 * | 12/2008 | Cheng ............................ | 60/775 |
| 2009/0031731 A1 | 2/2009 | Ziminsky et al. | |
| 2009/0084082 A1 * | 4/2009 | Martin et al. .............. | 60/39.281 |
| 2011/0265488 A1 * | 11/2011 | Lawson et al. .................. | 60/775 |

FOREIGN PATENT DOCUMENTS

EP  1985925  10/2008

* cited by examiner

*Primary Examiner* — Gerald L Sung
(74) *Attorney, Agent, or Firm* — Fletcher Yoder P.C.

(57) ABSTRACT

According to various embodiments, a system includes a fuel controller configured to control a fuel transition between a first flow of a first fuel and a second flow of a second fuel into a fuel nozzle of a combustion system. The fuel controller is configured to adjust a third flow of a diluent in combination with the second flow of the second fuel to maintain a pressure ratio across the fuel nozzle above a predetermined operating pressure ratio.

20 Claims, 6 Drawing Sheets

SYSTEM FOR FUEL AND DILUENT CONTROL

BACKGROUND OF THE INVENTION

The subject matter disclosed herein relates to flow control systems and, more particularly, to systems for fuel and diluent flow control.

A variety of combustion systems burn a fuel to create energy. For example, an integrated gasification combined cycle (IGCC) power plant includes one or more gas turbine engines that burn a fuel to create energy that powers a load. One of the fuels used by the gas turbine engine may be syngas produced by one or more gasifiers of the IGCC power plant. Operation of the gas turbine engine may require a minimum fuel nozzle pressure ratio to avoid flame holding, flashback, or other problems. As a result, the gas turbine engine may be incapable of operating below a minimum load for certain fuels, such as syngas. For example, during startup, the gas turbine engine may operate using natural gas up to the minimum load, and then transition to operation using the syngas. This operational limit reduces the efficiency of the gas turbine engine and the IGCC power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel controller configured to control a fuel transition between a first flow of a first fuel and a second flow of a second fuel into a fuel nozzle of a combustion system. The fuel controller is configured to adjust a third flow of a diluent in combination with the second flow of the second fuel to maintain a pressure ratio across the fuel nozzle above a predetermined operating pressure ratio.

In a second embodiment, a fuel controller is configured to control a pressure ratio across a fuel nozzle in a combustion system to prevent flashback or flame holding. The fuel controller is configured to adjust a first flow of a diluent in combination with a second flow of a fuel to maintain the pressure ratio above a predetermined operating pressure ratio.

In a third embodiment, a system includes a fuel controller configured to adjust a first flow of a diluent in combination with a second flow of a fuel to maintain a pressure ratio across a fuel nozzle above a predetermined operating pressure ratio. The fuel controller is configured to increase the first flow of the diluent and decrease the second flow of the fuel to enable operation of a combustion engine at a lower load.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
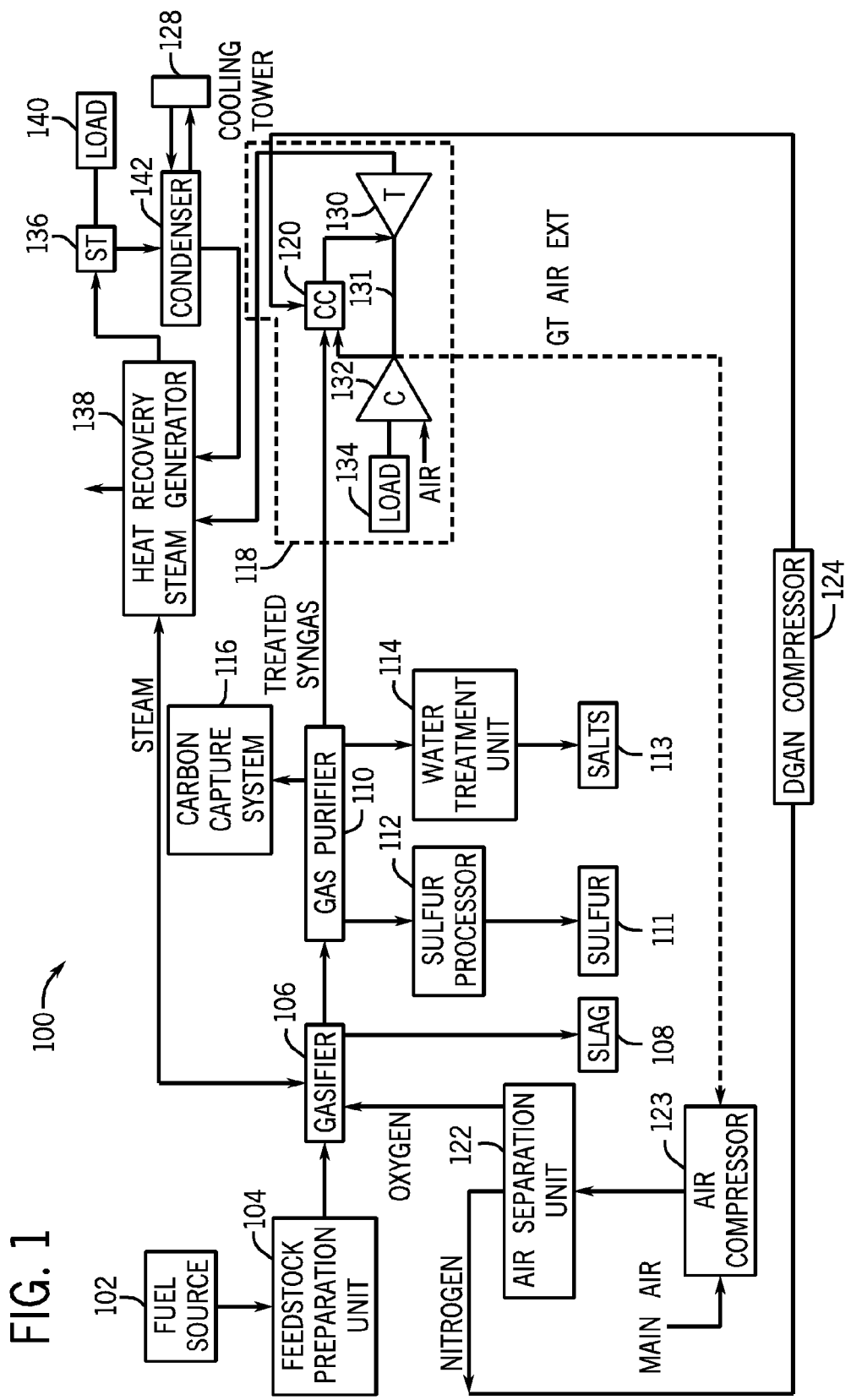
FIG. 1 is a block diagram of an embodiment of an IGCC power plant incorporating a gas turbine engine with a fuel control system configured to expand an operational range of the gas turbine engine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments increase the operational range of a gas turbine engine by diluting a fuel to control a fuel nozzle pressure ratio (FNPR), thereby enabling operation with the fuel at lower loads. In addition, the disclosed embodiments are capable of controlling the FNPR across the entire operating range of the gas turbine engine. The gas turbine engine may burn one or more different fuels. For example, gas turbine engines used in IGCC power plants may burn syngas produced by one or more gasifiers as fuel. However, the availability of syngas may be affected by startups, shutdowns, unscheduled outages, or routine maintenance. During such situations, gas turbine engines may use natural gas instead of syngas or a combination of natural gas and syngas. When there is a large difference between heating values of the fuels, as with natural gas and syngas, each fuel may be directed to a separate fuel nozzle of the combustion system. For example, in certain embodiments, natural gas may be directed to a primary nozzle and syngas may be directed to a secondary nozzle. Because of the difference in design flow rates and heating values of the fuels, a nozzle area of the primary nozzle may be less than that of the secondary nozzle. In other embodiments, where the heating values of two fuels are similar, one fuel nozzle may be used for both fuels. Devices, such as control valves, may be used to adjust the flow rates of the fuels and/or fuel mixtures.

In addition to fuels, a diluent may be directed to a combustor of the gas turbine engine. In general, diluents may be include vapors or gases, such as inert gases or non-combustible gases or vapors. Specific examples of diluents include, but are not limited to, nitrogen, carbon dioxide, steam, water vapor, or combinations thereof. As with fuels, the diluent may be directed to a separate nozzle in the combustor of the gas turbine engine. Alternatively, the diluent may be mixed with one or more of the fuels prior to injection into the gas turbine engine. In addition, a device, such as a control valve, may control the flow rate of the diluent.

A fuel control system may send signals to the fuel and diluent control valves to control the flow rates of the fuels and diluent to control an operational range of the gas turbine engine. To determine the flow rates of the fuels and diluent, the controller may receive signals based on either measured or calculated parameters. In various embodiments described in detail below, the fuel control system may receive signals based on the FNPR, which is defined as the fuel supply pressure divided by the combustor pressure, e.g., upstream pressure divided by downstream pressure. In order for fuel to flow into the combustor, the fuel supply pressure is greater than the combustor pressure, which results in an FNPR greater than one. Furthermore, operation of the combustor may be limited to operation between a minimum, or lower or predetermined operating, FNPR and a maximum, or upper, FNPR. Operation below the minimum FNPR or above the maximum FNPR may result in undesirable combustion dynamics, flame holding, flashback, or other problems. Although the fuel supply pressure may be measured, the combustor pressure typically is not. Therefore, the FNPR may not be directly measured, but may be inferred from other gas turbine engine operating conditions. In various embodiments described below, examples of gas turbine engine operating conditions that may be used to infer the FNPR include, but are not limited to, inlet guide vane (IGV) position, corrected speed, exhaust temperature, fuel flow rate, fuel lower heating value (LHV), or combinations thereof. The corrected speed refers to the speed a component would rotate at if the inlet temperature corresponded to ambient conditions at sea level.

A heating value may be used to define energy characteristics of the fuel. For example, the heating value of the fuel may be defined as the amount of heat released by combusting a specified quantity of fuel. In particular, a LHV may be defined as the amount of heat released by combusting a specified quantity (e.g., initially at 25 degrees C. or another reference state) and returning the temperature of the combustion products to a target temperature (e.g., 150 degrees C.). LHV may be represented in the units of Megajoule (MJ) per kilogram (kg). In the following discussion, LHV may be used to indicate the heating value of various fuels, but it is not intended to be limiting in any way. Any other value may be used to characterize the energy and/or heat output of feedstock within the scope of the disclosed embodiments.

In presently contemplated embodiments, the FNPR may be used by the fuel control system to control the fuel and diluent flow rates to control an operational range of the gas turbine engine. For example, the disclosed embodiments control the diluent flow to maintain the FNPR between the minimum FNPR and the maximum FNPR to preserve the integrity of the gas turbine engine, while more specifically maintaining the FNPR above the minimum FNPR to prevent flashback and flame holding. Above the minimum FNPR, a flame is maintained at a proper distance away from a tip of the fuel nozzle. When the distance between the flame and the tip of the fuel nozzle is small or non-existent, referred to as flame holding, the flame may damage the tip of the fuel nozzle. In addition, operation above the minimum FNPR may prevent flashback, e.g. travel of the flame upstream through the fuel nozzle. Thus, the minimum FNPR may define one boundary of an operating envelope of the gas turbine engine. In the disclosed embodiments, the diluent is added to the fuel specifically to maintain a suitable FNPR, thereby eliminating the typical operational boundary based on the minimum FNPR associated with the fuel. In other words, the fuel may be diluted with the diluent to maintain the minimum FNPR, while allowing the gas turbine engine to operate with the fuel at a much lower load.

Thus, according to certain embodiments, the fuel control system may inject nitrogen, steam, or other diluents into one of the fuel streams to adjust the FNPR. Specifically, a number of variables may affect the FNPR, including the fuel ratio (while operating with multiple fuels) and the flow rate of diluent being fed to the gas turbine engine. For example, decreasing the ratio of syngas to natural gas reduces the FNPR and increasing the flow rate of diluent increases the FNPR. Thus, without the diluent, operating below a minimum syngas flow rate may cause the FNPR to drop below the minimum FNPR. For example, the IGCC power plant may include several gasifiers that supply syngas to the gas turbine engines. If one or more of the gasifiers shuts down, the total supply of syngas may be reduced to a level insufficient for one or more of the gas turbine engines to operate above the minimum FNPR. By increasing the flow rate of diluent to increase the FNPR, the disclosed embodiments enable the gas turbine engine to continue to operate even when one or more of the gasifiers are shut down. In various embodiments, the diluent may be blended with one of the fuels prior to injection into the combustor of the gas turbine engine. By adjusting the flow rate of the diluent, the fuel control system may maintain operation above the minimum FNPR and thus, effectively increase the operating range of the gas turbine engine. The increased operating range is particularly advantageous during startup (e.g., transition from natural gas to syngas), periods of low demand, or downtime of the gasifiers.

Turning now to the drawings, FIG. 1 is a diagram of an embodiment of an IGCC system 100 that produces and burns syngas. As discussed in detail below, the IGCC system 100 may include an embodiment of a gas turbine engine fuel controller that maintains the FNPR in a suitable range of FNPR values, thereby preventing flashback or flame holding. Other elements of the IGCC system 100 may include a fuel source 102, which may be a solid or a liquid, that may be utilized as a source of energy for the IGCC system. The fuel source 102 may include coal, petroleum coke, oil, biomass, wood-based materials, agricultural wastes, tars, coke oven gas and asphalt, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The feedstock may be passed to a gasifier 106 from the feedstock preparation unit 104. The gasifier 106 may convert the feedstock into a syngas, e.g., a combination of carbon monoxide (CO) and hydrogen. This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 106 utilized. The gasification process may include the feedstock undergoing a pyrolysis process, whereby the feedstock is heated. Temperatures inside the gasifier 106 may range from approximately 150 degrees C. to 700 degrees C. during the pyrolysis process, depending on the fuel source 102 utilized to generate the feedstock. The heating of the feedstock during the pyrolysis process may generate a solid (e.g., char) and residue gases (e.g., CO, hydrogen, and nitrogen). The char remaining from the feedstock from the pyrolysis process may only weigh up to approximately 30% of the weight of the original feedstock.

The volatiles generated during the pyrolysis process, also known as devolatilization, may be partially combusted by introducing oxygen to the gasifier 106. The volatiles may react with the oxygen to form $CO_2$ and CO in combustion reactions, which provide heat for the subsequent gasification reactions. The temperatures generated by the combustion reactions may range from approximately 700 degrees C. to 1600 degrees C. Next, steam may be introduced into the gasifier 106 during a gasification step. The char may react with the $CO_2$ and steam to produce CO and hydrogen at temperatures ranging from approximately 800 degrees C. to 1100 degrees C. In essence, the gasifier utilizes steam and oxygen to allow some of the feedstock to be "burned" to produce CO and release energy, which drives a second reaction that converts further feedstock to hydrogen and additional $CO_2$.

In this way, the gasifier 106 manufactures a resultant gas. This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 106 may also generate waste, such as slag 108, which may be a wet ash material. This slag 108 may be removed from the gasifier 106 and disposed of, for example, as road base or as another building material. To clean the untreated syngas, a gas purifier 110 may be utilized. In one embodiment, the gas purifier 110 may be a water gas shift reactor. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas may include approximately 3% CO, approximately 55% $H_2$, and approximately 40% $CO_2$ and is substantially stripped of $H_2S$.

In some embodiments, a carbon capture system 116 may remove and process the carbonaceous gas (e.g., carbon dioxide that is approximately 80-100 or 90-100% pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The captured carbon dioxide may be transferred to a carbon dioxide expander, which decreases the temperature of the carbon dioxide (e.g., approximately 5-100 degrees C., or about 20-30 degrees C.), thus enabling the carbon dioxide to be used as a suitable cooling agent for the system. The cooled carbon dioxide (e.g., approximately 20-40 degrees C., or about 30 degrees C.) may be circulated through the system to meet its refrigeration needs or expanded through subsequent stages for even lower temperatures. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. As described in detail below, the gas turbine engine fuel controller may adjust flow rates of the fuel, compressed air, and/or compressed nitrogen to maintain the FNPR between certain values, thereby preventing flashback or flame holding. Combustion of the fuel may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
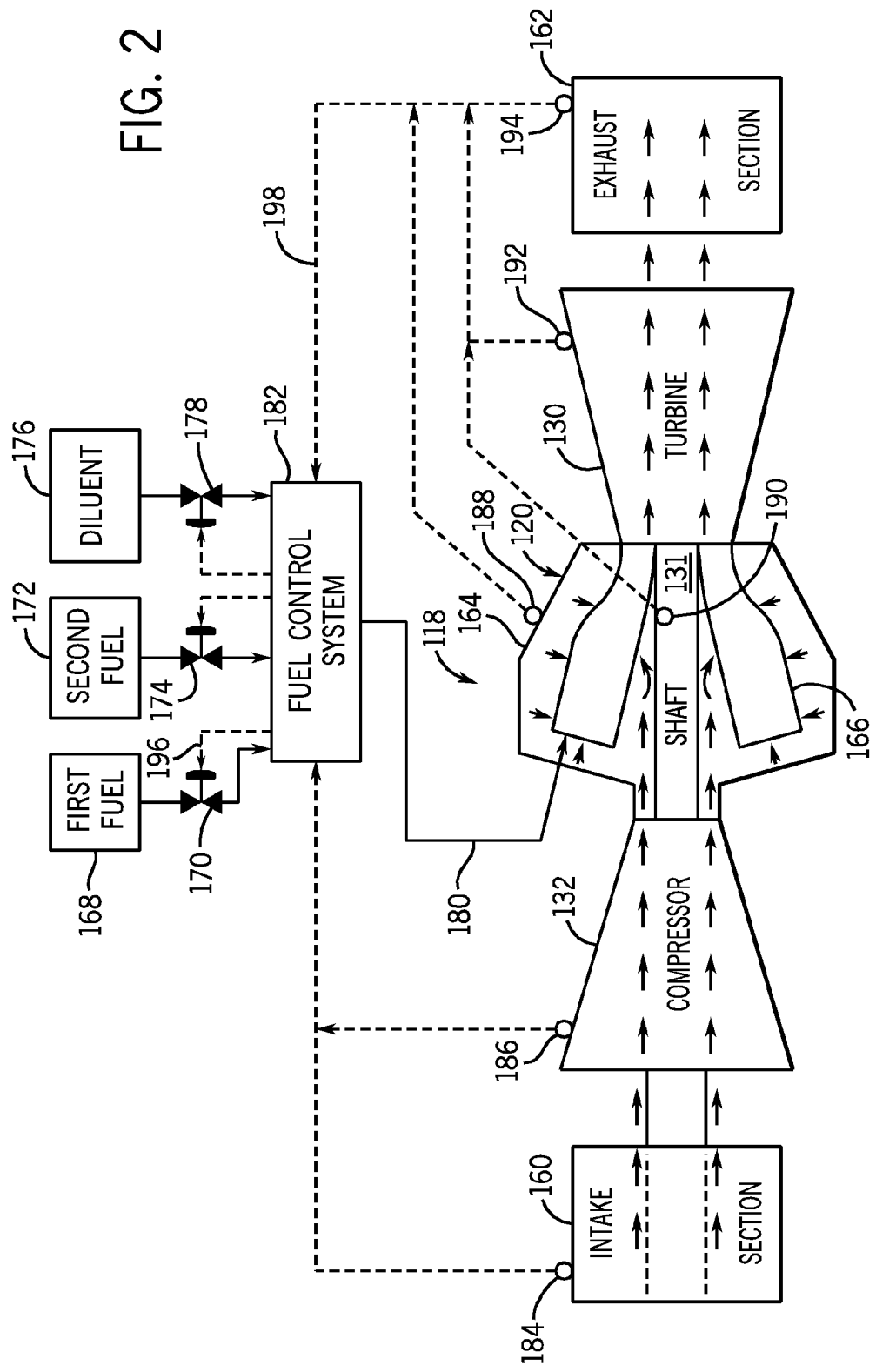
FIG. 2 is a block diagram of a gas turbine engine incorporating an embodiment of a fuel control system configured to expand an operational range of the gas turbine engine.

FIG. 2 is a block diagram of a gas turbine engine 118 that may include an exemplary fuel control system configured to expand an operational range of the gas turbine engine 118 by adding a diluent to a fuel to maintain a suitable FNPR, thereby preventing flashback and flame holding. Not only may the gas turbine engine 118 be used in the IGCC system 100 described above, but in certain embodiments, the gas turbine engine 118 may be used in aircraft, watercraft, locomotives, power generation systems, or combinations thereof. The illustrated gas turbine engine 118 includes an air intake section 160, the compressor 132, a combustor section 166, the turbine 130, and an exhaust section 162. The turbine 130 is coupled to the compressor 132 via the drive shaft 131.

As indicated by the arrows, air may enter the gas turbine engine 118 through the intake section 160 and flow into the compressor 132, which compresses the air prior to entry into the combustor section 166, also referred to as the combustion system. The illustrated combustor section 166 includes a combustor housing 164 disposed concentrically or annularly about the drive shaft 131 between the compressor 132 and the turbine 130. The compressed air from the compressor 132 enters one or more combustors 120 where the compressed air may mix and combust with fuel within the combustors 120 to drive the turbine 130. From the combustor section 166, the hot combustion gases flow through the turbine 130, driving the compressor 132 via the drive shaft 131. For example, the combustion gases may apply motive forces to turbine rotor blades within the turbine 130 to rotate the drive shaft 131. After flowing through the turbine 130, the hot combustion gases may exit the gas turbine engine 118 through the exhaust section 162.

The gas turbine engine 118 may use one or more fuels. For example, the gas turbine engine 118 may be configured to burn a first fuel 168, which may include, but is not limited to, natural gas, distillate, liquefied petroleum gas (LPG), or a combination thereof. A first fuel control valve 170 may adjust the flow rate of the first fuel 168. However, other flow adjusting or flow controlling devices may be used instead of the control valves shown in FIG. 2. In addition, the gas turbine engine 118 may be configured to burn a second fuel 172, which may include, but is not limited to, syngas. As described above, syngas may be produced by one or more gasifiers of the IGCC system 100. A second fuel control valve 174 may adjust the flow rate of the second fuel 172. Finally, a diluent 176 may be injected into the gas turbine engine 118. As described above, examples of the diluent 176 include, but are not limited to, nitrogen, carbon dioxide, steam, water vapor, or combinations thereof. A diluent control valve 178 may adjust the flow rate of the diluent 176. The first fuel 168, the second fuel 172, and the diluent 176 may be directed to the combustor 120 via injection line 180. Although the injection line 180 is shown as a single line, separate lines may be used for each of the first fuel 168, the second fuel 172, and/or the diluent 176. Alternatively, the diluent 176 may be blended with either the first fuel 168 or the second fuel 172 prior to injection into the combustor 120. In addition, although shown as flowing directly to the combustor 120, the injection line 180 may be directed to one or more fuel nozzles disposed in the head end of the combustor 120.

In the illustrated embodiment, a fuel control system 182, or fuel controller, is shown schematically between the combustor 120 and the first and second fuels 168 and 172, and the diluent 176. The fuel control system 182 may receive one or more signals, or feedback, from various sensors disposed throughout the gas turbine engine 118 to increase an operational range of the gas turbine engine 118 via control of the diluent 176, thereby preventing flashback and flame holding. For example, an intake section sensor 184 may send a signal to the fuel control system 182. Examples of parameters measured by the intake section sensor 184 include, but are not limited to, intake temperature, intake pressure, intake flow rate, intake humidity, or combinations thereof. Next, a compressor sensor 186 may send a signal to the fuel control system 182. Examples of parameters measured by the compressor sensor 186 include, but are not limited to, compressor temperature, compressor pressure, inlet guide vane (IGV) position, or combinations thereof at one or more compressor stages. A combustor sensor 188 may send signals indicative of parameters in the combustor section 166 to the fuel control system 182. Examples of parameters measured by the combustor sensor 188 include, but are not limited to, FNPR, combustor temperature, combustor pressure, combustion gas composition, combustion dynamics, flame characteristics, or combinations thereof. Next, a turbine sensor 192 may be used to measure parameters in the turbine 130 and to send signals to the fuel control system 182. Examples of parameters measured by the turbine sensor 192 include, but are not limited to, turbine temperature, turbine pressure, turbine speed, turbine vibration, or combinations thereof at one or more turbine stages. Finally, an exhaust sensor 194 may be used to send signals to the fuel control system 182. Examples of parameters measured by the exhaust sensor 194 include, but are not limited to, exhaust temperature, exhaust pressure, exhaust gas composition (e.g., emissions), speed of the drive shaft 131, corrected speed, or combinations thereof.

In response to the signals 198 received from the various sensors of the gas turbine engine 118, the fuel control system 182 may send signals 196 to the first fuel control valve 170, the second fuel control valve 174, and/or the diluent control valve 178 to control the FNPR (or other parameters) to expand the operational range of the gas turbine engine 118. For example, the fuel control system 182 may receive signals 198 indicating that additional diluent 176 is needed to increase the FNPR above the minimum FNPR, and/or less diluent 176 is needed to reduce the FNPR below the maximum FNPR. If the FNPR is low, then the fuel control system 182 may send signals 196 to open the diluent control valve 178 and/or partially close the first and second fuel control valves 170 and 174. In addition to the parameters discussed above, other sensors disposed within the gas turbine engine 118 or in adjacent equipment may indicate parameters that may be used by the fuel control system 182. Examples of other parameters include, but are not limited to, heating values, load status, fuel pressure, fuel flow rate, diluent pressure, diluent flow rate, or combinations thereof. Examples of specific control schemes used by the fuel control system 182 are described in more detail below.

Figure 3:
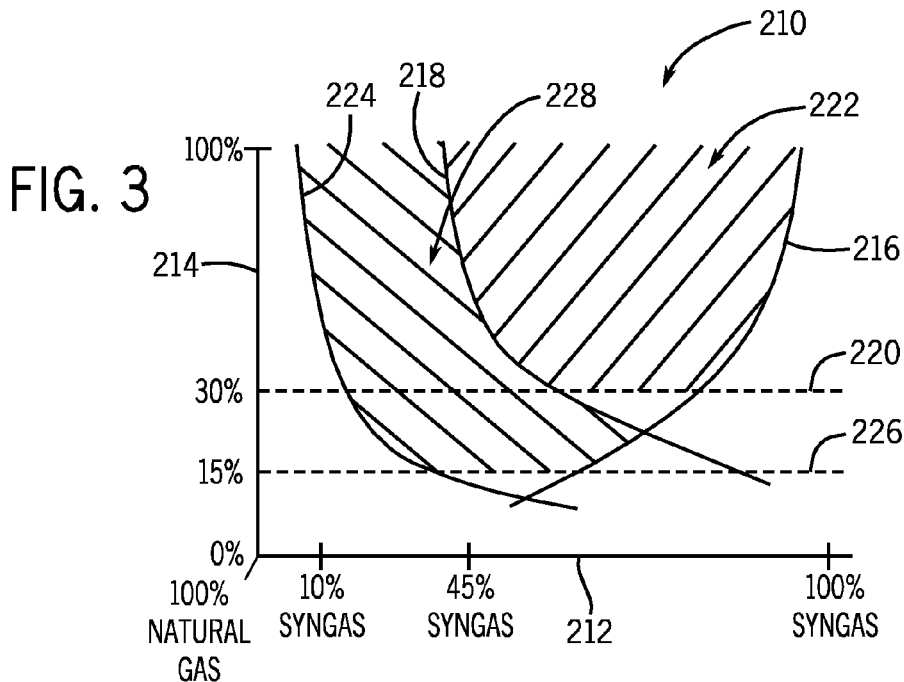
FIG. 3 is a graph of an operating envelope for a gas turbine engine according to an embodiment.

FIG. 3 shows a graph 210 of an embodiment of an operating envelope of a gas turbine engine, illustrating an operational expansion using the fuel control system 182 to adjust diluent and thus FNPR. An x-axis 212 indicates the ratio of the first fuel to the second fuel, which may be referred to as a co-fire ratio. In the graph 210, the first fuel is natural gas and the second fuel is syngas. On the left end of the x-axis 212, the co-fire ratio represents 100% natural gas and 0% syngas. Accordingly, on the right end of the x-axis 212, the co-fire ratio represents 0% natural gas and 100% syngas. A y-axis 214 indicates a load of the gas turbine engine. Specifically, the lower end of the y-axis 214 represents 0% load and the upper end of the y-axis 214 represents a maximum load of 100%.

In the graph 210, a natural gas control valve minimum stroke curve 216 represents an upper boundary of the operating envelope of the gas turbine engine. A stroke of the control valve may refer to a position of a trim, stem, plug, ball, or similar device, inside the control valve, which is capable of varying the flow rate through the control valve. For example, at a stroke of 0%, little or no flow may pass through the control valve. Correspondingly, at a stroke of 100%, the flow rate may approach a maximum for the control valve. In addition, the control valve may have a minimum stroke below which controlling the flow rate is not recommended because control may become erratic. In other words, the flow rate is not controlled below the minimum stroke and instead, the valve is closed by reducing the stroke to 0%. The minimum stroke may be a function of a pressure drop across the control valve and/or the flow rate passing through the control valve. For example, at high flow rates, the minimum stroke of the natural gas control valve may be close to 0%. However, as the flow rate decreases, the minimum stroke may increase.

With the preceding in mind and returning to the graph 210, the natural gas minimum stroke curve 216 gradually slopes down and to the left as the load decreases. For example, at a load of approximately 100%, the corresponding co-fire ratio along the natural gas curve 216 is approximately 10% natural gas and 90% syngas. In other words, if the load is approximately 100%, the minimum stroke of the natural gas control valve is low enough to enable good control of the valve down to a flow rate corresponding to a co-fire ratio of approximately 10% natural gas and 90% syngas. In contrast, at a load of approximately 15%, represented by line 226, the corresponding co-fire ratio along the natural gas curve 216 is approximately 60% natural gas and 40% syngas. In other words, if the load is approximately 15%, the minimum stroke of the natural gas control valve is greater, such that good control of the valve is enabled only to a flow rate corresponding to a co-fire ratio of approximately 60% natural gas and 40% syngas. Thus, operation with less than approximately 60% natural gas may be desired at a load of approximately 15%, but may not possible because of the minimum stroke of the natural gas control valve. More generally, operation of the gas turbine engine at lower loads may be limited to higher percentages of natural gas and lower percentages of syngas than may be desired.

In the graph 210, a minimum FNPR curve 218 represents a lower boundary of the operating envelope of the gas turbine engine. The FNPR increases as the heating value of the fuel decreases. Syngas has a higher concentration of hydrogen than natural gas, which means that the heating value of syngas is lower than that of natural gas. For example, syngas may have a heating value that is 3 times, 4 times, 5, times, 6 times, 7 times, or 8 times lower than that of natural gas. Thus, the minimum FNPR curve 218 slopes down and to the right as the load decreases. For example, at a load of approximately 100%, the corresponding co-fire ratio along the minimum FNPR curve 218 is approximately 55% natural gas and 45% syngas. In other words, if the load is approximately 100%, the minimum FNPR may be maintained if at least approximately 45% syngas is fed to the gas turbine engine. In contrast, at a load of approximately 15%, the corresponding co-fire ratio along the minimum FNPR curve 218 is approximately 25% natural gas and 75% syngas. In other words, if the load is approximately 15%, the minimum FNPR is greater, such that more syngas, namely at least approximately 75%, is fed to maintain operation of the gas turbine engine above the minimum FNPR. Thus, for example, operation with less than approximately 75% syngas may be desired at a load of approximately 15%, but may not possible because the minimum FNPR cannot be maintained. More generally, operation of the gas turbine engine at lower loads may be limited to lower percentages of natural gas and higher percentages of syngas than may be desired.

In addition, a minimum load of approximately 30%, represented by line 220, may serve as a third boundary for the operating envelope of the gas turbine engine. Although the gas turbine engine may operate in a small area of the operating envelope below 30% load and between natural gas and minimum FNPR curves 216 and 218, 30% may be selected as a convenient minimum to help prevent the gas turbine engine from quickly exceeding the boundaries established by natural gas and minimum FNPR curves 216 and 218 where their curvatures increase. Thus, the natural gas control valve minimum stroke curve 216, the minimum FNPR curve 218, and the minimum load of 30% curve 220 may define an operating region 222.

Also shown in FIG. 3 near the left side of the graph 210 is a syngas control valve minimum stroke curve 224. As with the natural gas control valve, control of the syngas control valve may become erratic below a minimum stroke. For example, near a load of approximately 100%, the corresponding co-fire ratio along the syngas curve 224 is approximately 90% natural gas and 10% syngas. As the load decreases, the syngas curve 224 slopes to the right, such that at a load of approximately 15%, the corresponding co-fire ratio along the syngas curve 224 may be approximately 60% natural gas and 40% syngas. Thus, without the minimum FNPR curve 218, the syngas control valve minimum stroke curve 224 would represent the lower boundary for the operating envelope of the gas turbine engine.

Accordingly, in various embodiments described below, diluent may be added to the fuel stream to the gas turbine engine to avoid the minimum FNPR curve 218 as the lower boundary for the operating envelope of the gas turbine engine. Specifically, the heating value of the diluent may be low. Thus, by adding diluent to the fuel, the heating value of the mixture is decreased, which increases the FNPR. In certain embodiments, by increasing the FNPR, operation above the minimum FNPR may be maintained, while at the same time decreasing the amount of syngas fed to the gas turbine engine. Thus, the minimum load of the gas turbine engine may shift from approximately 30%, represented by line 220, to approximately 15%, represented by line 226 enabling the gas turbine engine to operate at a lower load. In other words, the operating envelope of the gas turbine engine, operating with diluent added to the fuel, may include not only operating region 222, but also operating region 228, which results because the syngas control valve minimum stroke curve 224 represents the new lower boundary. For example, the range of co-fire ratios of the gas turbine engine at approximately 100% load may increase from a range of approximately 45% syngas and 55% natural gas to 90% syngas and 10% natural gas to a new range of approximately 10% syngas and 90% natural gas to 90% syngas and 10% natural gas. The range of co-fire ratios increases for all loads between the new minimum load of 15% and the maximum load of 100%.

The increased range of co-fire ratios of the gas turbine engine may be advantageous during startup and/or shutdown situations. For example, during startup of the IGCC plant 100 and gas turbine engine 118, syngas may not be immediately available in desired quantities because one or more gasifiers 106 may be offline. Without adding diluent to the fuel, startup of the gas turbine engine 118 may be delayed until sufficient syngas is available for the gas turbine engine 118 to operate near the co-fire ratio of approximately 45% syngas and 55% natural gas. However, according to particular embodiments, the fuel controller may increase the flow of diluent and decrease the flow of syngas so that the co-fire ratio changes to approximately 10% syngas and 90% natural gas. Thus, the gas turbine engine 118 may be started when less syngas is available, which may enable the gas turbine engine 118 to be started sooner during the startup of the IGCC plant 100. Specifically, the gas turbine engine 118 may be started up approximately 1 hour, 2 hours, 3 hours, or 5 hours sooner when diluent is added to the fuel according to an embodiment. Thus, the amount of flaring to meet emission permit limits during startup may be reduced. Flaring refers to the burning of gases from an elevated stack. As syngas becomes more available during startup, the fuel controller may control a fuel transition from natural gas to syngas to maintain operation above the minimum FNPR. Correspondingly, the fuel controller may control the fuel transition from syngas to natural gas as syngas becomes less available during shutdown of the combustion system to maintain operation above the minimum FNPR. Thus, the increased range of co-fire ratios may be advantageous during startup (e.g., transition from natural gas to syngas), periods of low demand, or maintenance or downtime of one or more of the gasifiers of the IGCC plant 100.

Figure 4:
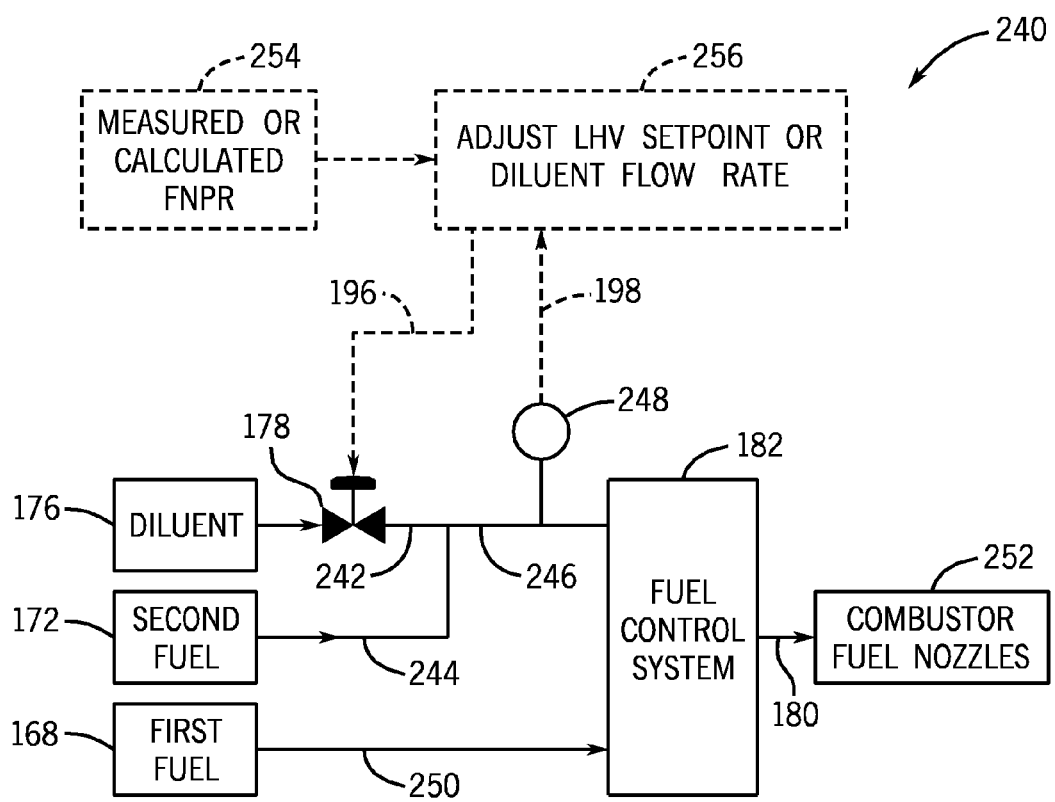
FIG. 4 is a block diagram of an embodiment of a fuel control system configured to expand an operational range of the gas turbine engine.

FIG. 4 is a block diagram of an embodiment of a fuel control system 240 that may be used to achieve the increased operating envelope and help prevent flashback and flame holding as discussed above. Elements in common with those shown in FIG. 2 are labeled with the same reference numerals. In the illustrated embodiment, the diluent 176 is blended with the second fuel 172 prior to injection in the gas turbine engine. Specifically, a diluent line 242 may join with a second fuel line 244 to mix the diluent 176 with the second fuel 172. The mixture of the diluent 176 and the second fuel 172 is directed to the gas turbine engine through a diluent and second fuel mixture line 246. Disposed on the diluent and second fuel mixture line 246 may be a LHV sensor 248, such as, but not limited to, a calorimeter. A first fuel line 250 carries the first fuel 168 to the gas turbine engine. The fuel control system 182 may adjust the flow rates of the first fuel 168, the second fuel 172, and/or the diluent 176 flowing to combustor fuel nozzles 252. The line 180 carrying the first fuel 168, the second fuel 172, and the diluent 176 to the combustor fuel nozzles 252 may consist of one or more lines.

In block 254 of FIG. 4, the FNPR is measured or calculated. Using the FNPR from block 254 and the signal 198 representing the LHV as measured by LHV sensor 248, the LHV setpoint or the diluent flow rate is adjusted in block 256. As discussed above, the FNPR increases as the LHV decreases. Again, the diluent may include a vapor or gas, such as a noble gas or non-combustible gas or vapor. Examples include steam, nitrogen, carbon dioxide, or combinations thereof. Thus, by adding diluent to the fuel, the LHV decreases and the FNPR increases. For example, if the FNPR from block 254 decreases, block 256 may send signal 196 to the diluent control valve 178 to increase the diluent flow rate. Likewise, if the LHV, as measured by LHV sensor 248, increases, block 256 may send signal 196 to the diluent control valve 178 to increase the flow rate of the diluent 176. Specific embodiments of fuel control systems 182 are discussed in more detail below.

Figure 5:
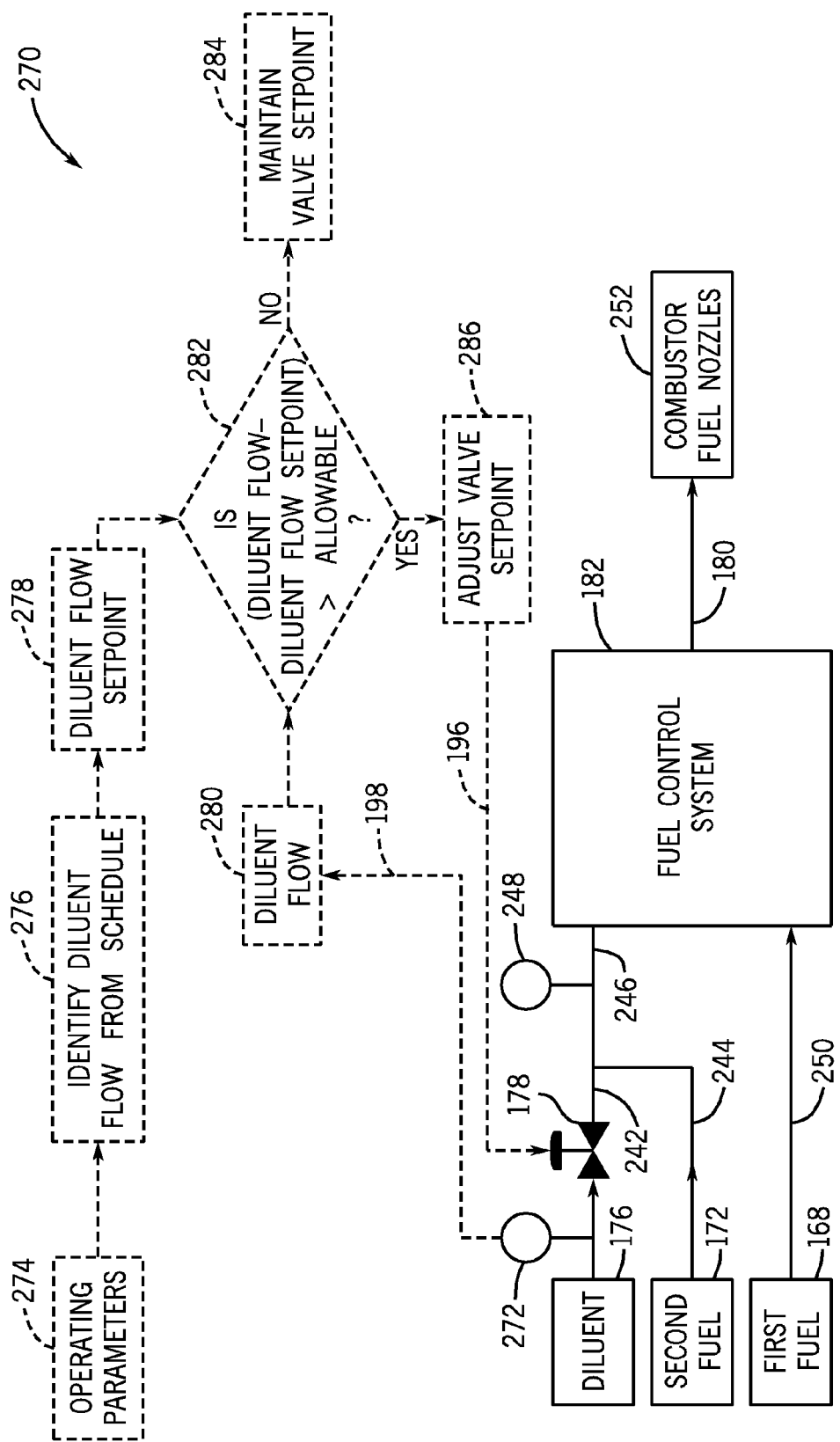
FIG. 5 is a block diagram of an embodiment of a fuel control system using schedule-based control.

For example, FIG. 5 shows an embodiment of a fuel control system 270 using schedule-based, or open-loop, control. Elements in common with those shown in FIG. 4 are labeled with the same reference numerals. A diluent flow meter 272 measures the flow rate of the diluent 176. Other aspects of the first fuel 168, second fuel 172, and diluent 176 are similar to that described above. Block 274 represents the values of operating parameters obtained from sensors throughout the gas turbine engine. Examples of measured operating parameters include, but are not limited to, inlet guide vane (IGV) position, corrected speed, exhaust temperature, fuel flow rate, fuel LHV, or combinations thereof. In block 276, a diluent flow rate is identified using a schedule and based on the measured operating parameters from block 274. The schedule of block 276 may be included in control software and/or memory of the fuel control system 182. In addition, the schedule is established to maintain the minimum FNPR across all anticipated operating conditions, thereby preventing flashback and flame holding. For example, a theoretical schedule may be developed and then verified and adjusted in the field based on temporary FNPR measurements. Block 278 represents the diluent flow rate setpoint selected using the schedule of block 276. In addition, block 280 represents the measured diluent flow rate based on the signal 198 from the diluent flow meter 272.

In decision block 282 of FIG. 5, the difference between the measured diluent flow rate from block 280 and the diluent flow setpoint from block 278 is determined. If the difference is less than an allowable value, then in block 284, the setpoint for the diluent control valve 178 is maintained. In other words, the diluent flow rate is maintained near the current measured diluent flow rate. Thus, the allowable value represents a range that the measured diluent flow rate may deviate from the diluent flow setpoint. On the other hand, if the difference between the measured diluent flow rate and the diluent flow rate setpoint is greater than the allowable value, then in block 286, the setpoint for the diluent control valve 178 is adjusted. For example, if the measured diluent flow rate is greater than the diluent flow rate setpoint, then the setpoint for the diluent control valve 178 is decreased. On the other hand, if the measured diluent flow rate is less than the diluent flow rate setpoint, then the diluent flow rate setpoint to the diluent control valve 178 is increased. By maintaining the diluent flow rate at or near the diluent flow rate setpoint, the fuel control system 182 may maintain the FNPR above the minimum FNPR and increase the operability envelope of the gas turbine engine as described above. Furthermore, schedule-based control may be useful when the gas turbine engine operates at certain defined operating points.

Figure 6:
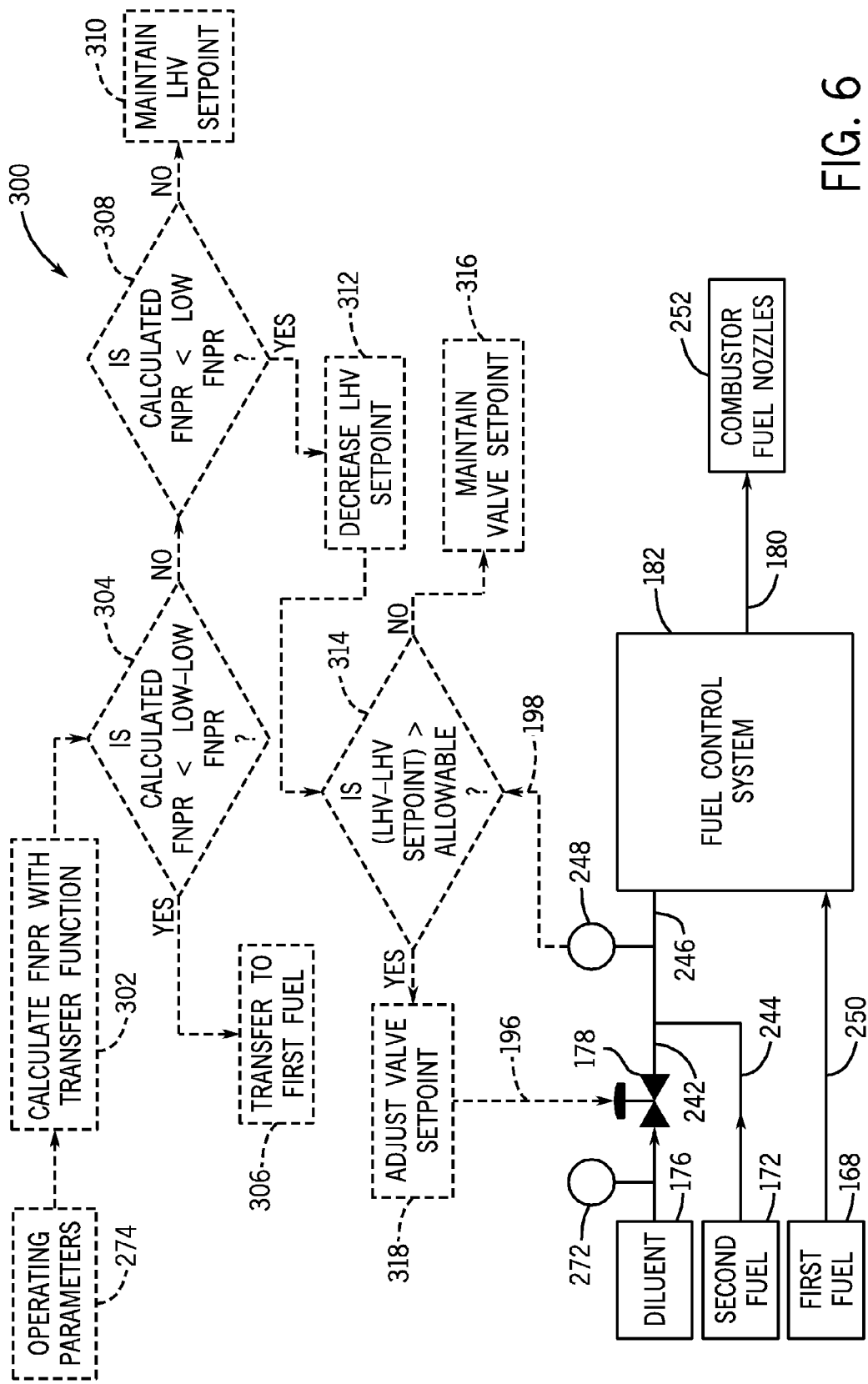
FIG. 6 is a block diagram of an embodiment of a fuel control system using a transfer function for closed-loop control.

FIG. 6 shows an embodiment of a fuel control system 300 using a transfer function for closed-loop control. Elements in common with those shown in FIG. 5 are labeled with the same reference numerals. As with the schedule-based control shown in FIG. 5, block 274 represents measured operating parameters of the gas turbine engine. In block 302, the FNPR is calculated based on a transfer function built into the control software stored on memory. The transfer function may be a mathematical representation of a relationship between input and output of a system. For example, the transfer function may be derived using a Laplace transform. In decision block 304, the calculated FNPR is compared with a low-low FNPR value. The low-low FNPR value is less than a low FNPR value that may result in an alarm. If the calculated FNPR is less than the low-low FNPR value, then in block 306, the fuel to the gas turbine engine is transferred, or transitioned, from the second fuel 172 to the first fuel 168, which may be natural gas, distillate, LPG, or a combination thereof, in certain embodiments. The first fuel 168 may also be referred to as a backup fuel or startup fuel. As described above, the primary nozzle may be used for the first fuel 168 and the secondary nozzle may be used for the second fuel 172. The nozzle area of the primary nozzle may be much less than that of the secondary nozzle. Thus, the pressure drop across the primary nozzle is much higher than that of the secondary nozzle, which may cause the FNPR to increase. This increase in the FNPR may be much larger than the decrease in FNPR caused by the transition to the first fuel 168 with a higher heating value than the second fuel 172. Thus, by switching to the first fuel 168, the calculated FNPR may increase above the low-low FNPR value. If for some reason, the calculated FNPR falls below a low-low-low FNPR value, then the gas turbine engine is shut down. The low-low-low FNPR value is less than the low-low FNPR value.

Returning to decision block 304, if the calculated FNPR is greater than the low-low FNPR level, then the calculated FNPR is compared with a low FNPR level in decision block 308. If the calculated FNPR is greater than the low FNPR level, then in block 310 the LHV setpoint is maintained. In other words, the flow rate of the diluent 176 is maintained at the current flow rate. On the other hand, if the calculated FNPR is less than the low FNPR level, then in block 312, the LHV setpoint is decreased by sending a signal 196 to the diluent control valve 178. Next, in decision block 314, the difference between the LHV and the LHV setpoint is calculated. If the difference is less than an allowable value, then in block 316, the setpoint for the diluent control valve 178 is maintained. However, if the difference between the LHV and the LHV setpoint is greater than the allowable value, then in block 318, the setpoint of the diluent control valve 178 is adjusted. For example, if the measured LHV based on LHV sensor 248 is less than the LHV setpoint, then the flow rate of the diluent 176 is increased. On the other hand, if the LHV is greater than the LHV setpoint, then the flow rate of the diluent 176 is decreased. Thus, the fuel control system 182 may maintain the FNPR above the minimum FNPR and increase the operability envelope of the gas turbine engine and help prevent flashback and flame holding as described above. Furthermore, using the transfer function may be useful when the effect of a few operating parameters on the FNPR can be identified and defined.

Figure 7:
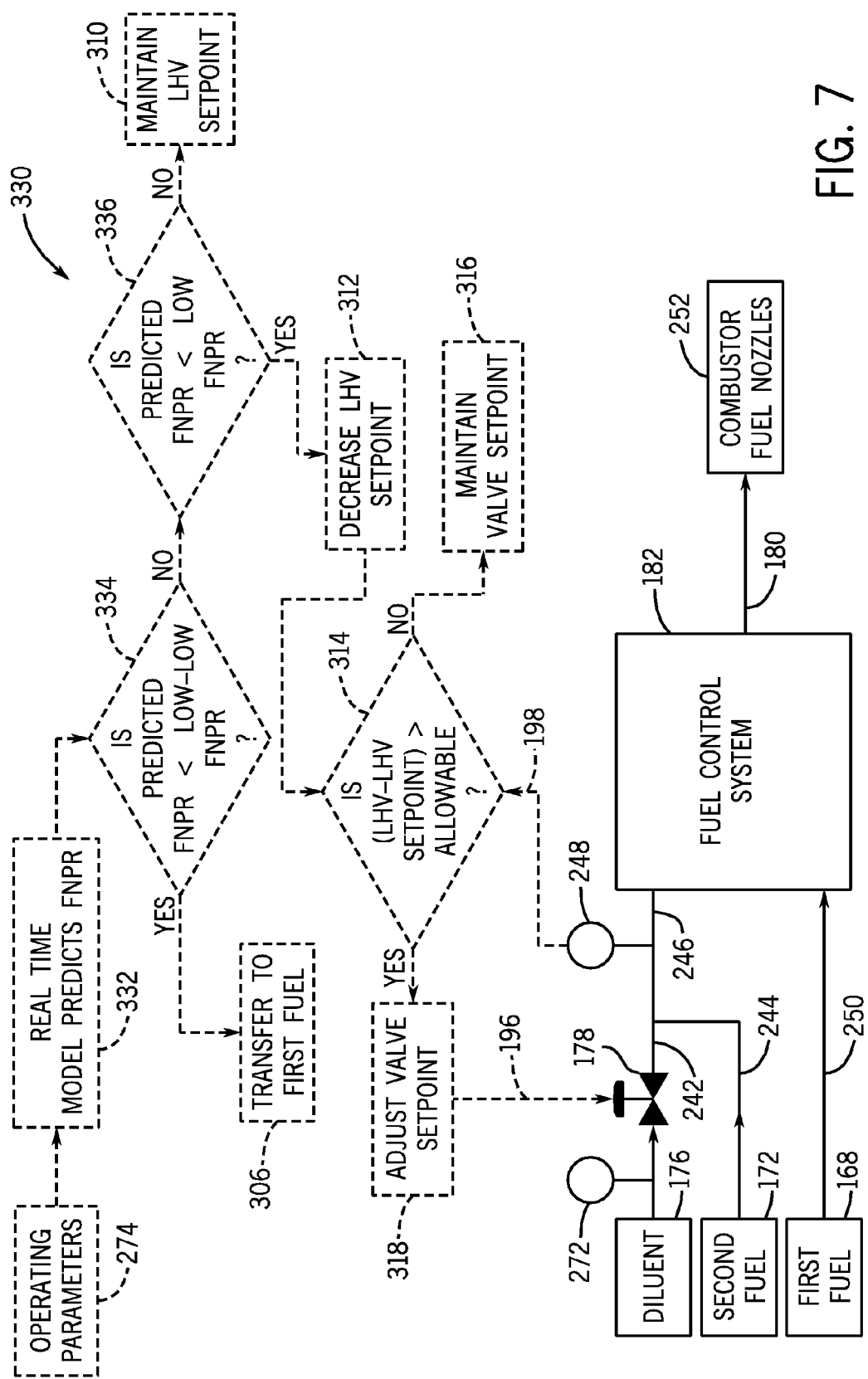
FIG. 7 is a block diagram of an embodiment of a fuel control system using a model for closed-loop control.

FIG. 7 shows an embodiment of a fuel control system 330 using a model for closed-loop control. Elements in common with those shown in FIG. 6 are labeled with the same reference numerals. Block 274 represents measured operating parameters of the gas turbine engine, such as those described above. In block 332, a real time gas turbine engine model predicts the FNPR. For example, one type of model-based control is model predictive control (MPC), which is an advanced method of process control that relies on dynamic models of the process, most often linear empirical models obtained by system identification. Using these dynamic models, the fuel control system 182 can predict future values of the FNPR and take appropriate action to maintain the FNPR within a defined range. In decision block 334, the predicted FNPR is compared with a low-low FNPR value, which is less than a low FNPR value that may result in an alarm. If the predicted FNPR is less than the low-low FNPR value, then in block 306, operation of the gas turbine engine is transitioned to the first fuel 168. If the predicted FNPR falls below a low-low-low FNPR value, which is less than the low-low FNPR value, then the gas turbine engine is shut down.

Returning to decision block 334, if the predicted FNPR is greater than the low-low FNPR value, then the predicted FNPR is compared with a low FNPR level in decision block 336. If the predicted FNPR is greater than the low FNPR, then in block 310, the LHV setpoint is maintained. On the other hand, if the predicted FNPR is less than the low FNPR, then in block 312, the LHV setpoint is decreased. In decision block 314, the difference between the LHV and the LHV setpoint is calculated and compared with an allowable value. If the difference is less than the allowable value, then in block 316, the setpoint for the diluent control valve 178 is maintained. On the other hand, if the difference between the LHV and the LHV setpoint is greater than the allowable value, then in block 318, the setpoint of the diluent control valve 178 is adjusted. Other aspects of the model-based control shown in FIG. 7 are similar to that of the transfer function based closed-loop control shown in FIG. 6. In addition, other methods of process control other than those described above may be used to control the flow rate of diluent 176 to maintain the FNPR above the minimum FNPR. Examples of other technologies that may be used for the fuel control system 182 include, but are not limited to, linear or non-linear controllers, programmable logic controllers, distributed control systems, statistical process controllers, or other methods of process control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a fuel controller having memory storing instructions to control a fuel transition between a first flow of a first fuel and a second flow of a second fuel into a fuel nozzle of a combustion system, wherein the fuel controller has instructions to adjust a third flow of a diluent in combination with the second flow of the second fuel to maintain a pressure ratio across the fuel nozzle above a predetermined operating pressure ratio, wherein the pressure ratio comprises a fuel supply pressure divided by a combustor pressure, and wherein the fuel controller has instructions to measure or calculate the pressure ratio based at least on a measured fuel supply pressure, a measured combustor pressure, a transfer function stored on the memory, inferences based on operating conditions of the gas turbine engine, or a model of the combustion system, or any combination thereof.

2. The system of claim 1, wherein the fuel controller has instructions to control the pressure ratio across the fuel nozzle via adjustment of the third flow of the diluent to prevent flashback or flame holding problems.

3. The system of claim 1, wherein the fuel controller has instructions to increase the third flow of the diluent and decrease the second flow of the second fuel to enable operation of the combustion system at a lower load.

4. The system of claim 3, wherein the fuel controller has instructions to increase the third flow of the diluent and decrease the second flow of the second fuel while at least one gasifier of a plurality of gasifiers is offline.

5. The system of claim 1, wherein the fuel controller has instructions to control the fuel transition during startup or shutdown of the combustion system.

6. The system of claim 1, wherein the fuel controller has instructions to control the fuel transition in response to feedback indicative of at least one of a pressure, a temperature, a heating value, a flow rate, a speed, a load, or a combination thereof.

7. The system of claim 1, wherein the diluent comprises at least one of nitrogen, steam, or a combination thereof.

8. The system of claim 1, wherein the operating conditions of the gas turbine engine comprise at least one of an inlet guide vane (IGV) position, a corrected speed, an exhaust temperature, a fuel flow rate, or a fuel lower heating value (LHV), or any combination thereof.

9. A system, comprising:
a fuel controller having memory storing instructions to control a pressure ratio across a fuel nozzle in a combustion system to prevent flashback or flame holding problems, wherein the pressure ratio comprises a fuel supply pressure divided by a combustor pressure; wherein the fuel controller has instructions to adjust a first flow of a diluent in combination with a second flow of a fuel to maintain the pressure ratio above a predetermined operating pressure ratio, and wherein the fuel controller has instructions to measure or calculate the pressure ratio based at least on a measured fuel supply pressure, a measured combustor pressure, a transfer function stored on the memory, inferences based on operating conditions of the gas turbine engine, or a model of the combustion system, or any combination thereof.

10. The system of claim 9, wherein the fuel controller has instructions to control a fuel transition between the second flow of the fuel and a third flow of another fuel into the fuel nozzle, wherein the fuel controller has instructions to adjust the first flow of the diluent in combination with the second flow of the fuel to maintain the pressure ratio above the predetermined operating pressure ratio during the fuel transition.

11. The system of claim 9, wherein the fuel controller has instructions to obtain feedback indicative of a flow rate of the first flow of the diluent, wherein the fuel controller is configured to maintain the flow rate of the diluent above a diluent flow rate setpoint to maintain the pressure ratio above the predetermined operating pressure ratio.

12. The system of claim 9, wherein the fuel controller has instructions to obtain feedback indicative of a heating value of a mixture of the first flow of the diluent and the second flow of the fuel, wherein the fuel controller has instructions to maintain the heating value of the mixture above a heating value setpoint to maintain the pressure ratio above the predetermined operating pressure ratio.

13. The system of claim 9, wherein the fuel controller has instructions to increase the first flow of the diluent and decrease the second flow of the fuel to enable operation of the combustion system at a lower load.

14. The system of claim 9, wherein the fuel comprises syngas, and the diluent comprises a non-combustible gas or vapor.

15. The system of claim 9, wherein the operating conditions of the gas turbine engine comprise at least one of an inlet guide vane (IGV) position, a corrected speed, an exhaust temperature, a fuel flow rate, or a fuel lower heating value (LHV), or any combination thereof.

16. A system, comprising:
a fuel controller having memory storing instructions to adjust a first flow of a diluent in combination with a second flow of a fuel to maintain a pressure ratio across a fuel nozzle above a predetermined operating pressure ratio, wherein the pressure ratio comprises a fuel supply pressure divided by a combustor pressure; and wherein the fuel controller has instructions to increase the first flow of the diluent and decrease the second flow of the fuel to enable operation of a combustion engine at a lower load, and wherein the fuel controller has instructions to measure or calculate the pressure ratio based at least on a measured fuel supply pressure, a measured combustor pressure, a transfer function stored on the memory, inferences based on operating conditions of the gas turbine engine, or a model of the combustion system, or any combination thereof.

17. The system of claim 16, wherein the fuel controller has instructions to control a fuel transition between the second flow of the fuel and a third flow of another fuel into the fuel nozzle, wherein the fuel controller has instructions to adjust the first flow of the diluent in combination with the second flow of the fuel to maintain the pressure ratio above the predetermined operating pressure ratio during the fuel transition.

18. The system of claim 16, wherein the fuel controller has instructions to increase the first flow of the diluent and decrease the second flow of the fuel while at least one gasifier of a plurality of gasifiers is offline.

19. The system of claim 16, wherein the fuel controller has instructions to obtain feedback indicative of an operational parameter of the combustion system, wherein the fuel controller has instructions to adjust the first flow of the diluent to maintain the operational parameter within a range of a setpoint to maintain the pressure ratio above the predetermined operating pressure ratio.

20. The system of claim 16, wherein the operating conditions of the gas turbine engine comprise at least one of an inlet guide vane (IGV) position, a corrected speed, an exhaust temperature, a fuel flow rate, or a fuel lower heating value (LHV), or any combination thereof.

* * * * *